June 1, 1965 J. GIESEN ETAL 3,187,037
PROCESS FOR THE MANUFACTURE OF P-HYDROXYBENZOIC ACID
Filed Oct. 31, 1961
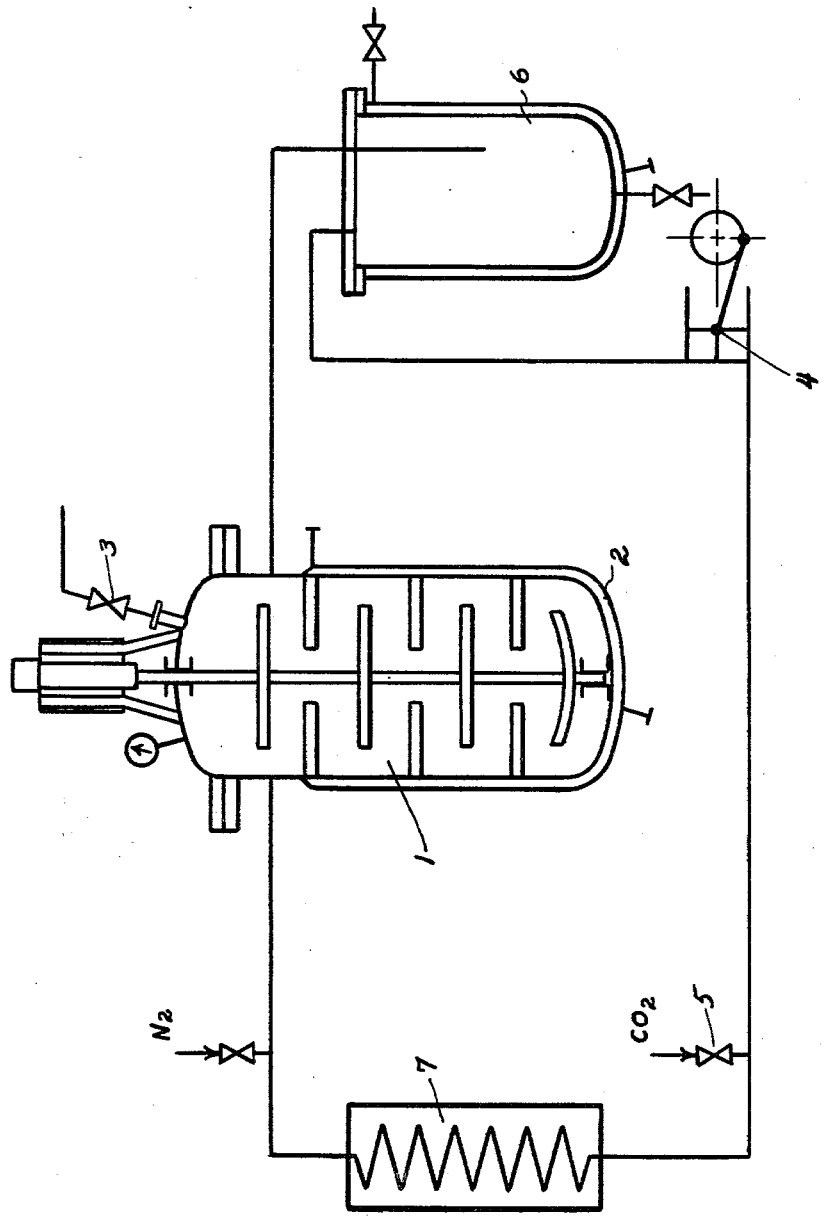
INVENTORS
JOHANN GIESEN
BY CLAU BERTHER
MESTERN & MESTERN

United States Patent Office 3,187,037
Patented June 1, 1965

3,187,037
PROCESS FOR THE MANUFACTURE OF
P-HYDROXYBENZOIC ACID
Johann Giesen, Haldenstein, Graubunden, and Clau Berther, Chur, Switzerland, assignors to Inventa A.G. fuer Forschung und Patentverwertung, Zurich, Switzerland
Filed Oct. 31, 1961, Ser. No. 149,064
Claims priority, application Switzerland, Oct. 31, 1960, 12,133/60
1 Claim. (Cl. 260—521)

The invention relates to a process for the manufacture of p-hydroxybenzoic acid and more particularly, to a process reacting the potassium salt of phenol with carbon dioxide at elevated temperature and pressure.

p-Hydroxybenzoic acid is used as a preserving agent and as an intermediate in the manufacture of synthetic substances. It is made, for example, according to FIAT No. 744 and BIOS No. 986 by allowing carbon dioxide to act under pressure and at a temperature between 180–220° C. on the anhydrous potassium salt of phenol. According to these proposals the reaction is carried out discontinuously in an autoclave under pressure, the carbon dioxide being pressed in in stages. After each carbonizing stage, pressure is released and the phenol formed is distilled off in vacuum. Pressing in of the carbon dioxide produces a strongly exothermic heat effect. Since the transmission of heat in the melt is very poor, it is difficult to remove the heat liberated within a profitable time. The addition of carbon dioxide, therefore, can take place only slowly so that the reaction lasts for over 60 hours with a charge of 4,200 kg. of potassium phenolate. Moreover, the danger exists that, if the carbon dioxide is pressed in too rapidly, the necessary reaction temperature of 210° C. will be greatly exceeded so that by-products are formed.

Various attempts have been made to overcome the disadvantages of this process, for example, to carry out the reaction in a suitable solvent. In the German Patent No. 955,598 various phenols have been proposed as solvents, whereas according to German Patent No. 960,206, the reaction is carried out in the fluidized-bed process, aluminium oxide or kaolin being used as a diluting agent. In this manner the exothermic heat effect is intended to be brought under control.

A process for the manufacture of p-hydroxybenzoic acid has now been found which does not possess the above-mentioned drawbacks, is carried out in a simple apparatus, and has very good results, both in conversion and in yield.

The object of the present invention is a process for the production of p-hydroxybenzoic acid by reaction of the potassium salt of phenol with carbon dioxide at elevated pressure and elevated temperature, which is characterized in that the process is carried out in an inert atmosphere, the inert gas being continuously removed from the reaction vessel and after cooling being again returned to the reaction mixture in the reaction vessel.

The process can be carried out, for example, as follows:

Potassium phenolate is introduced into an autoclave and, by pressing in carbon dioxide and nitrogen, the pressure at elevated temperature is held at 2–3 atmospheres until the beginning of the reaction. Carbon dioxide as well as an inert gas are conducted through a circulating gas system which leads from the autoclave to a condenser and back into the autoclave, the total pressure in the autoclave being increased slowly to 6–7 atmospheres. By varying the speed of circulation of the gas and the effectiveness of the condenser, the temperature in the autoclave can be kept constant in spite of the exothermic course of the carbonization. The phenol formed by the reaction is driven out of the reaction vessel with the circulating gas and separated in the condenser. The carbon dioxide which is consumed during the reaction must continuously be replaced.

The amount of the circulating gas must be kept so great that, on the one hand, the phenol present in the autoclave is removed as quickly as possible from the reaction mixture and, on the other hand, the heat produced is carried away. Under certain conditions, the cooling effect of the gas, on re-entering the reaction vessel, is too great, so that the mixture of carbon dioxide and inert gas must be heated after the separation of the phenol by an adjustable preheater.

In this manner, carbonization is complete after 5–10 hours. The phenol formed is separated quantitatively without requiring subsequent heating in a vacuum as practiced in the processes hitherto known. The progress of the reaction can be followed quantitatively by the amount of carbolic acid separated. The conversion by the process according to the invention amounts to 65 to 70% and the yield is above 85%. If so-called technical carbon dioxide is used, it is purified before being introduced into the autoclave over concentrated sulphuric acid.

The following example will explain the process with the aid of the drawing. However it should be understood that this is given merely by way of illustration, not of limitation, and that numerous changes may be made in the details without departing from the spirit and the scope of the invention as hereinafter claimed.

Example

In an autoclave 1, provided with a powerful stirrer which is carried in bearings at both ends, and a heating jacket 2 which can also be used as a cooling jacket, 6,325 parts by weight completely dry molten potassium phenolate are introduced at a temperature of 120° C. through valve 3. The autoclave is rinsed with nitrogen with good stirring, heated to 200° C., and the entire apparatus is placed under nitrogen pressure of 3 atmospheres. In lieu of nitrogen, any other inert gas can be used, i.e., any gas which will not participate in the reaction. The gas is circulated by means of the circulating pump 4, and carbon dioxide is pressed in through valve 5 so that the total pressure in the system is increased to 6 atmospheres. Heating of the autoclave is discontinued and the gas mixture is returned through the condenser 6 and the preheater 7, which previously had been disconnected, into the reaction vessel in such a manner that the temperature in the autoclave is kept constant at 200 to 210° C. The carbon dioxide enters into reaction with the potassium phenolate. Phenol is thereby formed which is driven out of the reaction chamber with the circulating gas and separated in condenser 6. The heat liberated the reaction is removed by the circulating gas. The partial pressure of the carbon dioxide in the system decreases in the same degree as the carbon dioxide is consumed. Carbon dioxide is now continuously pressed in until there is a pressure of 6 atmospheres, and the temperature in the autoclave is kept constant by adjusting the amount of circulating gas and by preheating. If required, the heat in the autoclave can again be turned on. The end of the reaction can be recognized by the fact that no more carbon dioxide is taken up and no more phenol is separated. This point is reached after about 6 hours. Then the pressure is released and the phenol, separated in condenser 6, is discharged. This amounts to 1575 parts by weight so that the conversion is 65% based on the phenol introduced. The heating in the autoclave is turned off, and the contents are cooled by passing nitrogen through the gas circulating system. As additional cooling, cooled oil is passed through the heating jacket 2. At 110° C., the reaction mixture is dissolved in water and the p-hydroxybenzoic acid is liberated as usual, for example, by acidifying with sulphuric acid. In this manner 3650 parts by weight of the hydroxy acid are obtained which corresponds to a yield of 85%.

We claim as our invention:

A process for the manufacture of p-hydroxybenzoic acid, which comprises introducing completely dry potassium phenolate into an autoclave at a temperature of substantially 120° C., rinsing said autoclave with nitrogen gas under mechanical agitation, placing the contents of the autoclave under pressure of 3 atmospheres, pressing in carbon dioxide until the pressure is increased to 6 atmospheres, withdrawing and cooling the mixture of gases introduced, while keeping said autoclave at a temperature of substantially 200–210° C., phenol formed in the reaction being withdrawn together with said gases, restoring the pressure in the autoclave to 6 atmospheres by pressing in new carbon dioxide, and keeping the temperature in said autoclave constant by regulating the amount and the temperature of the nitrogen gas reintroduced, releasing the pressure when the reaction between potassium phenolate and carbon dioxide ceases, dissolving the reaction product in water at approximately 110° C. and liberating the p-hydroxybenzoic acid therefrom.

References Cited by the Examiner
UNITED STATES PATENTS
2,749,362  6/56  Berni _____ 260—521

LORRAINE A. WEINBERGER,
*Acting Primary Examiner.*
CHARLES B. PARKER, LEON ZITVER, *Examiners.*